US010724870B2

(12) United States Patent
Adam et al.

(10) Patent No.: US 10,724,870 B2
(45) Date of Patent: Jul. 28, 2020

(54) METHOD OF PLANNING A ROUTE TO A DESTINATION

(71) Applicant: TomTom International B.V., Amsterdam (NL)

(72) Inventors: Thomas Bruce Watson Adam, Edinburgh (GB); Ian Malcolm Atkinson, Edinburgh (GB); Michael Joseph Dixon, Edinburgh (GB)

(73) Assignee: TOMTOM NAVIGATION B.V., Amsterdam (NL)

( * ) Notice: Subject to any disclaimer, the term of this patent is extended or adjusted under 35 U.S.C. 154(b) by 544 days.

(21) Appl. No.: 14/136,446

(22) Filed: Dec. 20, 2013

(65) Prior Publication Data

US 2014/0163849 A1 Jun. 12, 2014

Related U.S. Application Data

(63) Continuation of application No. 11/539,991, filed on Oct. 10, 2006, now abandoned.

(30) Foreign Application Priority Data

Oct. 10, 2005 (GB) .................................. 0520576.0

(51) Int. Cl.
*G01C 21/34* (2006.01)
*G08G 1/00* (2006.01)
(Continued)

(52) U.S. Cl.
CPC ........... *G01C 21/3492* (2013.01); *G08G 1/00* (2013.01); *G08G 1/0969* (2013.01);
(Continued)

(58) Field of Classification Search
CPC ......... G01C 21/3492; G08G 1/096827; G08G 1/00; G08G 1/096883; G08G 1/0969;
(Continued)

(56) References Cited

U.S. PATENT DOCUMENTS

| 5,752,217 | A | * | 5/1998 | Ishizaki | ............. | G01C 21/3446 |
| | | | | | | 701/410 |
| 5,845,227 | A | | 12/1998 | Peterson | | |

(Continued)

FOREIGN PATENT DOCUMENTS

| EP | 1253401 A2 | 10/2002 |
| EP | 1387145 A1 | 2/2004 |

(Continued)

OTHER PUBLICATIONS

International Search Report dated Jan. 4, 2007 for International Application No. PCT/GB2006/003765.

*Primary Examiner* — Stephen Holwerda

(57) ABSTRACT

The present invention combines the geographical coverage possible with fixed, pre-defined route segment costs (e.g. the legal speed limit) with, wherever possible, richer time dependent costs. A user of, for example, a portable navigation device, can therefore continue route planning as before to virtually any destination in a country covered by the stored map database, but wherever possible, can also use traffic data with time-dependent costs, so that the effect of congestion with any time predictability can be accurately taken into account as an automatic, background process. It leaves the user to simply carry on driving, following the guidance offered by the navigation device, without needing to be concerned about congestion that exists now, and whether it will impact his journey.

21 Claims, 3 Drawing Sheets

(51) Int. Cl.
*G08G 1/0968* (2006.01)
*G08G 1/0969* (2006.01)

(52) U.S. Cl.
CPC . *G08G 1/096827* (2013.01); *G08G 1/096844* (2013.01); *G08G 1/096883* (2013.01)

(58) Field of Classification Search
CPC .......... G08G 1/096844; G08G 1/0129; G08G 1/0133; G08G 1/0108; G08G 1/0125
USPC ........ 701/117, 118, 119, 420, 423, 424, 430, 701/450, 465, 532, 533, 540, 209
See application file for complete search history.

(56) References Cited

U.S. PATENT DOCUMENTS

| | | | |
|---|---|---|---|
| 5,878,368 A * | 3/1999 | DeGraaf | G01C 21/3461 340/988 |
| 5,911,773 A * | 6/1999 | Mutsuga | G01C 21/3492 340/990 |
| 5,931,888 A * | 8/1999 | Hiyokawa | G01C 21/34 701/411 |
| 5,991,689 A * | 11/1999 | Aito | G01C 21/3461 701/416 |
| 6,085,147 A | 7/2000 | Myers | |
| 6,230,099 B1 * | 5/2001 | Fabian | G01C 21/32 701/533 |
| 6,351,707 B1 * | 2/2002 | Ichikawa | G01C 21/3492 340/994 |
| 6,351,709 B2 * | 2/2002 | King | G01C 21/3492 340/990 |
| 6,356,836 B1 | 3/2002 | Adolph | |
| 6,480,785 B1 | 11/2002 | Joerg et al. | |
| 6,615,130 B2 | 9/2003 | Myr | |
| 6,622,087 B2 | 9/2003 | Anderson et al. | |
| 7,576,661 B2 | 8/2009 | Mochizuki | |
| 2001/0029425 A1 | 10/2001 | Myr | |
| 2001/0056327 A1 | 12/2001 | Jin | |
| 2002/0161519 A1 | 10/2002 | Mori et al. | |
| 2003/0187573 A1 | 10/2003 | Agnew et al. | |
| 2004/0044465 A1 | 3/2004 | Nesbitt | |
| 2005/0107950 A1 * | 5/2005 | Gelhar | G01O 21/3446 340/990 |

FOREIGN PATENT DOCUMENTS

| | | |
|---|---|---|
| EP | 1491859 A1 | 12/2004 |
| JP | H11083516 A | 3/1999 |
| JP | H11238194 A | 8/1999 |
| JP | 2001148094 A | 5/2001 |
| JP | 2002206936 A | 7/2002 |
| JP | 2002206937 A | 7/2002 |
| JP | 2002318124 A | 10/2002 |
| JP | 2003194562 A | 7/2003 |
| JP | 2003195743 A | 7/2003 |
| JP | 2003344074 A | 12/2003 |
| JP | 2004077254 A | 3/2004 |
| JP | 2004220574 A | 8/2004 |
| JP | 2005098749 A | 4/2005 |
| JP | 2005242424 | 9/2005 |
| JP | 2005259116 A | 9/2005 |
| WO | 9854682 A1 | 12/1998 |
| WO | 2004021305 A2 | 3/2004 |
| WO | 2004021306 A2 | 3/2004 |

* cited by examiner

METHOD OF PLANNING A ROUTE TO A DESTINATION

Cross-Reference to Related Applications

This application is a continuation application of U.S. patent application Ser. No. 11/539,991, filed Oct. 10, 2006, which claims priority from United Kingdom Patent Application No. 0520576.0, filed Oct. 10, 2005. The entire content of each of these applications is incorporated herein by reference.

BACKGROUND OF THE INVENTION

Field of the Invention

This invention relates to a method of planning a route to a destination; it finds application in computer implemented systems that enable an optimal driving route to be planned.

Description of the Prior Art

Road travel is a major part of everyday life for business and other organizations, and for private individuals. The costs of traffic delays can be very large. The purely financial cost has been estimated as billions of pounds in the UK alone. Given these costs, systems which can assist drivers to optimize their travel, for instance by selecting the best route and by avoiding congestion delays, are of significant value. In fact a diverse array of driver information systems have grown up:

Longest established are broadcast radio traffic reports which aggregate data from a number of sources (police, eye-in-the-sky, and more recently mobile phone calls from drivers stuck in jams) to provide subjective advice about incidents and delays. Radio Data Systems RDS radios make these systems more effective by automatically cutting to traffic reports from normal radio programs.

Static route planning systems are provided on the web by major motoring organizations (AA, RAC). These allow a driver to enter the points of a journey and be given a route and driving instructions for that route.

GPS based in-vehicle personal navigation systems (PNS) have been introduced. These use the position of the vehicle and a route computed using a traditional static cost function to issue instructions to guide the driver to their destination. Such systems have begun to incorporate traffic information into their services, but this is not integrated into the route selection; the user can observe delays where they impact the selected route, and manually guide the system to re-plan a route avoiding the delayed sections of road if they consider this necessary.

Real time traffic monitoring systems, based on various technologies (e.g. mobile phones, fixed cameras, GPS fleet tracking) are being used to identify traffic delays and to feed the information into notification systems.

As road congestion increases, systems providing route planning become more susceptible to error. A driver will not be pleased to ask for the fastest route from A to B, and then find themselves caught in a traffic jam for 50 minutes. Similarly, they will distrust a system which routes them along a busy A-road where they travel in convoy behind Heavy Goods Vehicle [HGVs] at 50 mph, while they could be traveling much faster on a slightly longer motorway route.

Known techniques for improved route planning require assigning individual road speeds to roads and sections of roads which more truly reflect the speed at which traffic can expect to travel on them. This assignment is generally static, that is to say that a section of road is assigned a fixed cost after surveying and analysis, and that cost is ever afterwards used as the cost of the road section in the routing algorithm. The cost can be reviewed, but this is as expensive as the original cost assignment. Hence, route planning algorithms in navigation devices work out route segment transit times using the road types defined in the map database stored on the device; an assumption may be made that vehicles on average travel at the legal speed limit for that type of road or some speed consistent with the class of the road. These map databases, from companies like TeleAtlas and NavTech, are the result of hugely costly and thorough surveying of roads, usually throughout an entire country. So the strength of this approach is that transit times can be estimated for every road in the map database. But its weakness is that the assumption of travel at the legal speed limit clearly breaks down for congested areas because the devices do not have reliable traffic information. The general approach for calculating a lowest cost route (e.g. quickest) can be thought of as comprehensive, but inaccurate if congestion occurs.

GPS portable satellite navigation devices with sophisticated route planning algorithms, such as the GO™ from TomTom International BV have become widespread in recent years and are used by large numbers of ordinary drivers: the benefits from integrating effective traffic data into these systems are considerable.

Prior art traffic monitoring systems have focussed on providing traffic flow data so that congestion can be avoided. But these systems have been limited mainly to major roads because of the infrastructure costs of developing the monitoring equipment (e.g. loop sensors buried in roads; camera based systems, such as number plate recognition systems) or because they rely on floating vehicle systems in which a relatively small proportion of all vehicles (equipped with dedicated hardware) are tracked, typically those moving on major roads and not urban areas. For commercial transportation companies, these limitation may be acceptable because their trucks mainly use the major roads anyway.

Overall, traffic monitoring services are not at all comprehensive, but useful when congestion occurs on a road that is monitored. But the usefulness is limited for two reasons. First, a user is merely informed of congestion; it is typically then down to the user to request appropriate action, such as to plan a new route, taking the congestion into account. Secondly, the congestion may have cleared by the time that the vehicle reaches the places that is indicated as being congested right now. Where congestion is predictable (i.e. it follows some kind of regularity or predictability in time, such as the morning rush hour, or congestion around a stadium when a major match is being played, or an accident that closes off one lane of a major road) then it is possible to estimate the possible congestion the vehicle will experience once it reaches the road that is currently congested. Time dependent traffic flow or transit time data (e.g. that at 8 am on each Monday morning, the transit time for a particular route segment is 20 minutes; it drops to 15 minutes at 1 pm and is 5 minutes at 11 pm etc.) can go some way to addressing this. Reference may be made to U.S. Pat. No. 6,356,836 and later WO 2004/021306. But to date, as noted above, this kind of data has typically only been applied to traffic monitoring systems that provide data for a relatively small proportion of roads in a country.

The overall effect is that a user can use route planning algorithms with time-dependent route segment costs, but is limited to route planning for the relatively small proportion of roads that are covered by the traffic monitoring system.

Accuracy is provided at the expense of geographical coverage. Alternatively, a user can use route planning algorithms based on fixed, pre-defined route segment costs (e.g. the legal speed limit). Geographical coverage is available, but at the expense of accuracy.

SUMMARY OF THE INVENTION

The invention involves a method of planning a route to a destination. It comprises the following steps:

(a) using a map database that defines roads in terms of route segments and includes a fixed, pre-defined, time-independent cost associated with each different route segment in the map database;

(b) using software that enables a route to be planned to a destination and that calculates an estimated cost of reaching that destination using one or more route segments;

wherein using the software involves planning a route by automatically using a combination of (i) time-dependent costs for one or more of the route segments in the route, such that a cost is applied to traversing a particular route segment that is appropriate for the specific time when it is planned to be traversed and (ii) the fixed, pre-defined, time-independent costs, for those route segments in the route that are not defined by the time-dependent costs.

The present invention combines the geographical coverage possible with fixed, pre-defined route segment costs (e.g. the legal speed limit) with, wherever possible, richer time dependent costs. A user of, for example, a portable navigation device, can therefore continue route planning as before to virtually any destination in a country covered by the stored map database, but wherever possible, can also use traffic data with time-dependent costs, so that the effect of congestion with any time predictability can be accurately taken into account as an automatic, background process. It leaves the user to simply carry on driving, following the guidance offered by the navigation device, without needing to be concerned about congestion that exists now, and whether it will impact his journey.

Further implementation details include the following:

The time-dependent cost associated with a particular route segment relates to vehicle speed or route segment transit times that have been measured or inferred and are not fixed and pre-defined. Measurement may take a variety of forms and will be described later. On the other hand, the fixed, pre-defined, time-independent cost associated with a particular route segment has not been measured or inferred from actual vehicle traffic flow or movement but instead is a function of (i) the type of road associated with that route segment or (ii) the speed limit applicable to that route segment. The time-independent costs are used in combination with the time dependent costs, for those route segments that are defined by both time-independent and time-dependent costs. The combination may take many different forms: the essence however is that there is still some value in the time-independent data in establishing the most accurate cost for a route segment, even though time dependent data may be available. For example, the quality of the time-dependent data may be too low to be entirely reliable; combining that data with the fixed, time-independent data with suitable relative weighting may give the most reasonable estimate. Likewise, time-dependent data may not be available for a specific route segment, but might be known for similar or nearby route segments and hence inferring a time dependency may be possible: but, as before, some weighting with the fixed, time-independent data, may be desirable.

Generally, the cost associated with a particular route will be the estimated time taken to reach the destination, since that it was most users are most interested in. But any other cost can also be used. The cost is any actual or perceived cost which the driver or someone else may choose to request or provide which relates to road segments. For example, the cost associated with a particular route could be the fuel useage associated with that route. Or the chargeable financial cost associated with that route—especially useful where road pricing is in place or there are other forms of direct payment, such as congestion zones. The cost associated with a particular route can be of a type that an end-user can select from a menu list displayed on a computing device. In the above examples, the menu list would include one or more of the following items: transit time for the route; financial cost for the route, fuel usage over the route; stationary traffic. In all cases, the software calculates the cost of the route as part of a cost minimisation algorithm.

One feature is that an estimated cost of reaching a destination for a particular driver of a vehicle is a function of a driving profile associated with that driver. Hence, the driving style (e.g. fast/aggressive/sport; normal; slow/cautious) can have a significant impact on costs (especially transit times and fuel usage). The method enables different profiles to be selected (e.g. by the driver himself, manually from a menu list displayed on a navigation device; or automatically by that device by monitoring actual driving); these are then used to select an appropriate set of costs or weighting factor to be applied to costs. For example, a driver in sport mode may have transit times reduced by 5%, other than in very congested areas.

As noted above, there are many ways of measuring actual vehicle traffic flows or movement data. For example, this can be done using GPS tracks (typically a record of the GPS position data at regular time or distance intervals). The GPS tracks can be stored by a GPS based navigation device in a vehicle travelling along the route segments. The GPS tracks could be sent over a cellular wireless network directly by the device to a traffic monitoring system, or sent directly by the device to a traffic monitoring system. The GPS tracks could be sent by a mobile telephone connected to the device over a piconet or other form of connection, or sent by the device when it is docked with a PC to a traffic monitoring system.

Measuring actual vehicle traffic flows or movement could also be achieved by measuring the location of mobile telephones; this can be done by passively monitoring signalling traffic from the mobile telephones to basestations. Measuring actual vehicle traffic flows or movement can also be achieved using loop sensors in roads, or using camera-based systems (e.g. number plate recognition systems) or using vehicles equipped with radio beacons.

The time-dependent costs can be dynamically updateable: hence as traffic conditions change, these changes can be detected by a traffic monitoring system and the changed costs used by the route planning software. This also covers the situation where an accident or other non-predictable event occurs; real-time dynamic updating is then very desirable.

The time-dependent costs associated with a route segment can be a function of one or more of many different time-related parameters. For example, they may be a function of
    the time of day or night.
    the days of the week.
    public holidays.
    school holidays.

More generally, any event that will likely impact on route segment costs; or any future situation about which it is possible to infer a likely impact on route segment cost.

Using the above method, a route can be planned to a destination, or two or more destinations, and the time of arrival at each destination will be significantly more accurate than current speed limit based approaches.

Another aspect of the invention is a navigation device programmed with:

(a) a map database that defines roads in terms of route segments and includes a fixed, pre-defined time-independent cost associated with each different route segment in the map database; and (b) software that enables a route to be planned to a destination and that calculates an estimated cost of reaching that destination using one or more route segments;

wherein the device can plan a route by automatically using a combination of (i) time-dependent costs for one or more of the route segments in the route, such that a cost is applied to traversing a particular route segment that is appropriate for the specific time when it is planned to be traversed and (ii) the fixed, pre-defined, time-independent costs, for those route segments in the route that are not defined by the time-dependent costs.

It is the device that calculates the lowest cost route to the destination; e.g. the fastest route, the route with the lowest fuel usage, the route with the lowest financial charges etc. Time-dependent costs can be pushed to the device or sent to the device on request by the device. For bandwidth efficiency, time-dependent costs received by the device can be restricted to a class of road types.

The device can include time-dependent costs on the same memory that includes the map database. Hence, one approach is to distribute memory cards or other memory physical formats not only with the full map database, but also with the time-dependent costs associated with many of the route segments in the database. Alternatively, the time-dependent costs could be made available to the device when it docks with an internet connected PC which can download the data from a server, or over-the-air, and then stored on the memory (typically a hard drive or solid state memory) in the device itself.

Another approach is for the remote server to send to the device a cost associated with moving from a start to the destination; the server receives a real-time traffic feed that enables it to supplement the time-dependent costs with recent data. Where the device receives real-time or recent traffic data or congestion information from the server, it automatically uses that data or information to re-calculate the optimal route.

It is also possible for:

(a) both the device and the server to each separately use the time-dependent costs;

(b) the device to inform the server of the lowest costs route that it has calculated; and (c) the server to send a notification to the device if the lowest cost route it has calculated is different from the route that the device has calculated.

Bandwidth can be saved if the server sends a notification to the device that defines solely the difference between the routes.

Another approach is:

(a) both the device and the server each separately use the time-dependent costs;

(b) the device identifies road segments for which recent data is valuable and requests that recent data from the server.

In any event, the device can suggest an optimal start time for a journey, if the user defines when he wishes to arrive.

The device itself can be a GPS based navigation device. It can be a mobile telephone with a location finding system, such as GPS. It can be a portable navigation device, such as a GO from TomTom, or it can be permanently embedded into a motor vehicle.

Other aspects are:

A traffic monitoring system that measures traffic speed or transit time data as a function of time and generates a historic database of time-dependent traffic speeds or transit times for segments of roads; and shares at least some of that database or its contents to enable the method defined above to be performed.

A digital map of a region, the map including data defining road segments, together with data defining time-dependent costs associated with at least some of the road segments, adapted to enable the method defined above to be performed when used by route planning software.

A motor vehicle including an embedded navigation system operable to plan a route using the method defined above.

DETAILED DESCRIPTION

Figure 1:
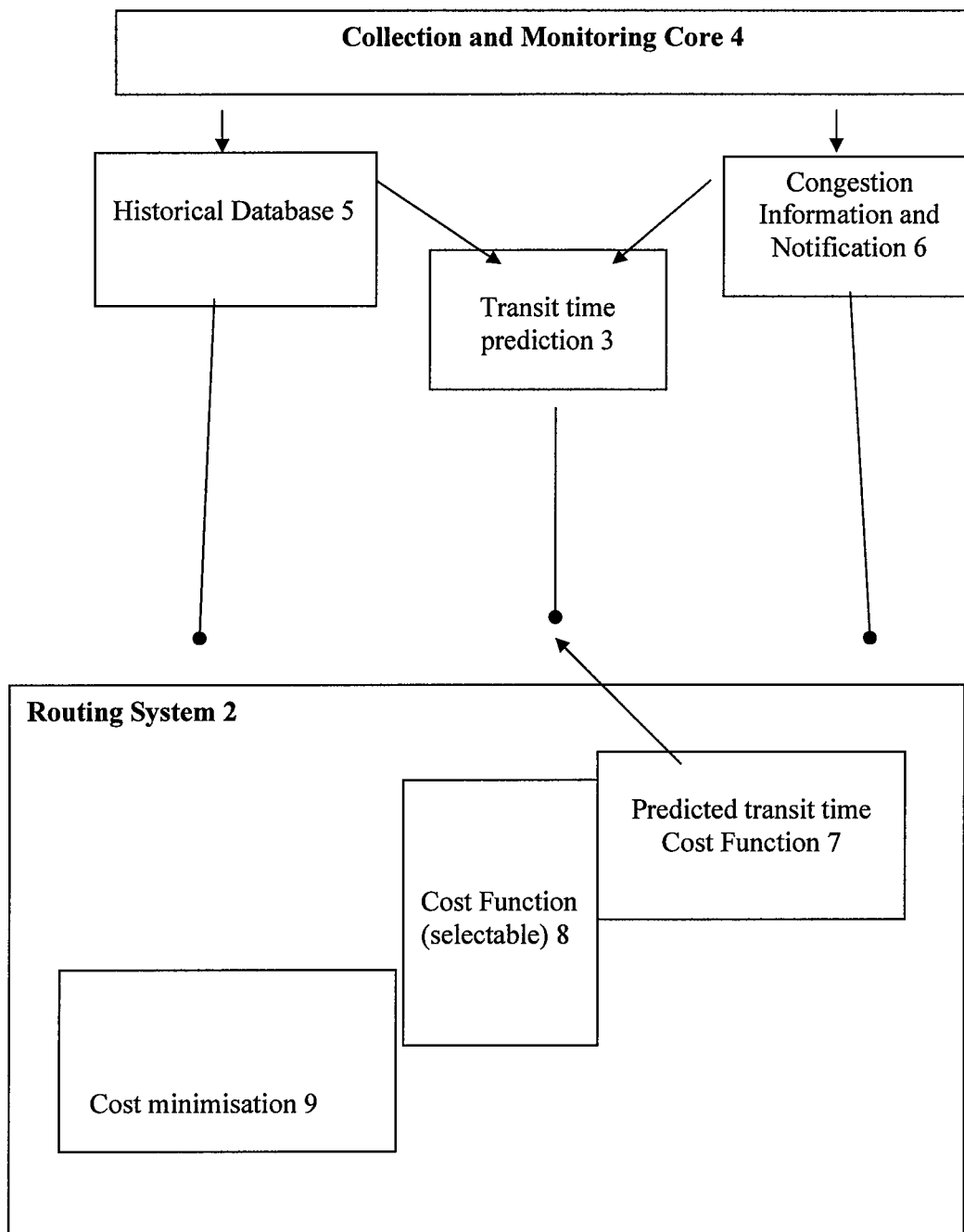
FIG. 1 is a schematic representation of a route planning system according to an embodiment of the present invention.

Various facilities exist for proposing a route on a road network to a driver who wishes to make a specific journey. The journey may be simply specified as between two points, or may be a more complex journey involving multiple locations which must be visited, not necessarily in a particular order. This is the kind of journey that a delivery driver would make. Whatever the form of the journey, the aim is to minimize a cost associated with the journey. The most obvious cost is the time duration, but any other cost may be relevant, for example the fuel used in making the journey. Users can restrict the choice of roads used, for instance some classes of commercial vehicles are prohibited from using all routes except Trunk routes when outside conurbations. These facilities are most usually embodied as computer systems encapsulating algorithms which assign a cost to a section of route, and which apply a cost minimization algorithm, such as Dijkstra to the graph of junctions and routes. In the simple case, the cost is fixed for each route, and is the journey time along the route when traveling at the normal speed of the route (typically this figure is the speed limit for the road in question, or a value simply derived from the speed limit). This can be termed a static cost function.

This does not take account of variations in the potential speed along the route, such as those caused by peak and off-peak periods. Neither does it account for the fact that the road speed limit is a very poor predictor of the safe usable speed of a road.

To solve the problem of variation in the cost of a road over time, the algorithm can be modified to attach a cost to a route which is dependent upon time of day. Then the input to the routing algorithm includes a time for which the best route is required, and the appropriate cost at the relevant time is applied to each route section. The problem with such systems is the provision of a good cost function for a route; one can generate a synthetic cost function by assigning a higher cost at peak times, but individual roads tend to have individual congestion patterns, so although a time varying cost can be an improved estimate of the true cost, it is far from perfect.

The present invention addresses the problem of providing a better cost estimate for roads to yield a more accurate driver routing system. A traffic monitoring system (or the historical output of a traffic monitoring system) is incorporated into the routing system. The historical traffic information yielded by the monitoring system is processed to provide cost predictions for the route and time of interest, and a cost minimization algorithm is then applied to the predicted costs of route segments to generate the proposed route or routes and their total predicted cost(s).

Because the new system provides time variable cost estimates and route suggestions, we also describe a framework for ensuring that a driver using what was originally proposed as the optimal route for a journey continues to follow the most optimal route as road conditions change dynamically.

In addition, the new system provides the opportunity for further refinements to a routing service. It can for instance be adapted to suggest a preferred time of travel within a selected time window, when this will result in the lowest cost of journey.

The present invention provides a method and system for generating optimized route plans and travel time estimates for a particular trip and departure or arrival time, and may also be used for proposing an optimal departure time. It uses the data and predictions generated by a traffic monitoring system to provide accurate travel time predictions for particular clock times on route segments. Combined with a traditional routing algorithm, this allows the best route to be selected for a journey taking into account the traffic conditions likely to be encountered. In particular, and as noted above, an implementation combines the geographical coverage possible with fixed, pre-defined route segment costs (e.g. the legal speed limit) with, wherever possible, richer time-dependent costs. A user of, for example, a portable navigation device, can therefore continue route planning as before to virtually any destination in a country covered by the stored map database, but wherever possible, can also use traffic data with time-dependent costs, so that the effect of congestion with any time predictability can be accurately taken into account as an automatic, background process. It leaves the user to simply carry on driving, following the guidance offered by the navigation device, without needing to be concerned about congestion that exists now, and whether it will impact his journey.

The system is shown in FIG. 1 and comprises
A traffic monitoring system 1
A routing system 2

These two systems are integrated such that the traffic monitoring system 1 provides a transit time prediction facility 3 which is used by the cost function 7 of the routing system 2 to provide accurate time-dependent road segment costs.

1. Traffic Monitoring System (TMS)

A traffic monitoring system 1 such as Applied Generics' RoDIN24 contains a collection and monitoring core 4 which observes, via some mechanism, the traffic in a designated geographical area.

Within the geographical area, the road network is segmented into short, discrete segments; typically segments end at junctions, though there may be multiple segments between widely spaced junctions. A processing module internal to the core generates either or both of:

Historical transit time information for road segments, stored in database 5. At a defined frequency, the system's estimate for the current time to traverse the road segment is recorded in the database, along with any other parameters which the system generates related to the traffic on the road segment. The method for calculating the transit time estimate is dependent on the traffic monitoring system; in RoDIN24 it is derived from the movements of mobile phones which the system believes with a high degree of probability have traversed the segment in question. Reference may be made to WO0245046, the contents of which are incorporated by reference.

Congestion information and notification 6. The system 6 identifies those road segments which are significantly congested (traveling at much less than expected road speed) and issues notifications to interested clients using an agreed protocol.

1.1 Transit Time Prediction

The traffic monitoring system 1 is augmented with a transit time prediction module 3. This is designed to provide an estimate of the expected transit time over any road segment within the ambit of the TMS 1, at any requested future time. Observe that a transit time prediction module 3 which always supplies the transit time at the speed limit of the road is a degenerate instance of this system, and when integrated with a routing system serves to implement route predictions in the traditional static manner. Hence, where the historic database 5 or congestion information/notification systems can provide no meaningful data, then the default position is that the transit time is simply a function of the speed limit—i.e. the conventional, fixed, time-independent data.

In the preferred embodiment, transit time prediction is based on an automatic analysis of the historical transit time information 5, and an integration with current congestion information 6. Prediction may be carried out continually for all segments for the near future, or may be carried out on demand when a request for a route calculation requires a particular road segment predicted transit time.

It is common in transport research to categorize the calendar into type of day, and within days of a particular type, to categorize time into peak, off-peak, daytime, evening, etc. Types of day may be
Weekday.
Friday, which tends to a different pattern from other weekdays.
Saturday.
Sunday.
Public holiday.
Phases of the year when schools are in session or on holiday further serve to divide up time.

By defining such a calendar as input to the TMS 1, historical data can be allocated to an appropriate category. Within each category, transit time estimates within a short time window may be grouped; 15 minutes is a realistic size of window. Then the historical information becomes structured in the form:
Weekday, school session, 08:00-08:15 estimated transit time 43 min average
Friday, school holidays, 08:30-08:45, estimated transit time 27 min average One mechanism for carrying out the transit time prediction 3 is to use the historical information categories, such as those just described. Then the predicted transit time for a journey at a particular clock time is given as the average transit time value of the category which contains the clock time.

A refinement of the same mechanism takes into account unusual incidents and congestion currently being observed by the congestion information system 6. The most recently observed transit times are compared with the predictions for their categories, and the future prediction is scaled in proportion to the ratio of recently observed to recently predicted transit times. For transit time predictions a long time in the future, scaling should not be applied. More generally, prediction should decay the observed to the average historical value as the distance of the prediction into the future grows.

Clearly the prediction mechanism may be made very sophisticated. The central improvement is that historical information is available and can be used to produce a much more accurate prediction of transit times for the route sections in the geographical area under consideration. But where there is no such information, then the conventional static, time-independent cost information is used.

2. Route Finder

Route finding can be implemented in a system 2 using any route finding algorithm which assigns costs to links in the network. The dynamic cost function is simply integrated into the routing algorithm.

2.1 Dynamic Cost Function

A dynamic cost function is a function of the road segment and the (presumably future) time of interest. This contrasts with a static cost function which is a function only of the road segment. The most common static cost function is transit time at the speed limit 7, but other costs functions can be selected 8 instead. A good dynamic cost function can be implemented by using the transit time prediction mechanism from the TMS 1. When the cost minimization algorithm is applied 9 for a particular time of travel, this dynamic cost function results in a more accurate predicted journey time and a selection of route which is closer to the optimal.

2.2 Routing with Dijkstra

There is a well-known algorithm, Dijkstra which allows the shortest path to be computed 9 between nodes on a graph. This is the standard algorithm employed to discover the shortest route on a road network. In Dijkstra's algorithm a fixed weight is attached to each edge in the graph; the cost for normal road routing is the transit time for the road section at the fixed limit speed attached to the road section.

Using the dynamic cost function, the cost of a graph edge is not a constant value, but varies over time. However, it can be shown that the necessary slight extension to the algorithm will still result in the calculation of the least cost path from a particular starting place and time; in fact only one cost is ever applied to a particular edge/road section, (during the relaxation phase of the algorithm), and as this cost is available to us from the dynamic cost function, the proof of the algorithm's correctness in our application is immediate.

In this implementation, we use fixed, pre-defined route segment costs (e.g. the legal speed limit) for some route segments, but, wherever possible, richer time dependent costs for other route segments. A user of, for example, a portable navigation device, can therefore continue route planning as before to virtually any destination in a country covered by the stored map database, but wherever possible, can also use traffic data with time-dependent costs, so that the effect of congestion with any time predictability can be accurately taken into account as an automatic, background process. It leaves the user to simply carry on driving, following the guidance offered by the navigation device, without needing to be concerned about congestion that exists now, and whether it will impact his journey.

Figure 2:
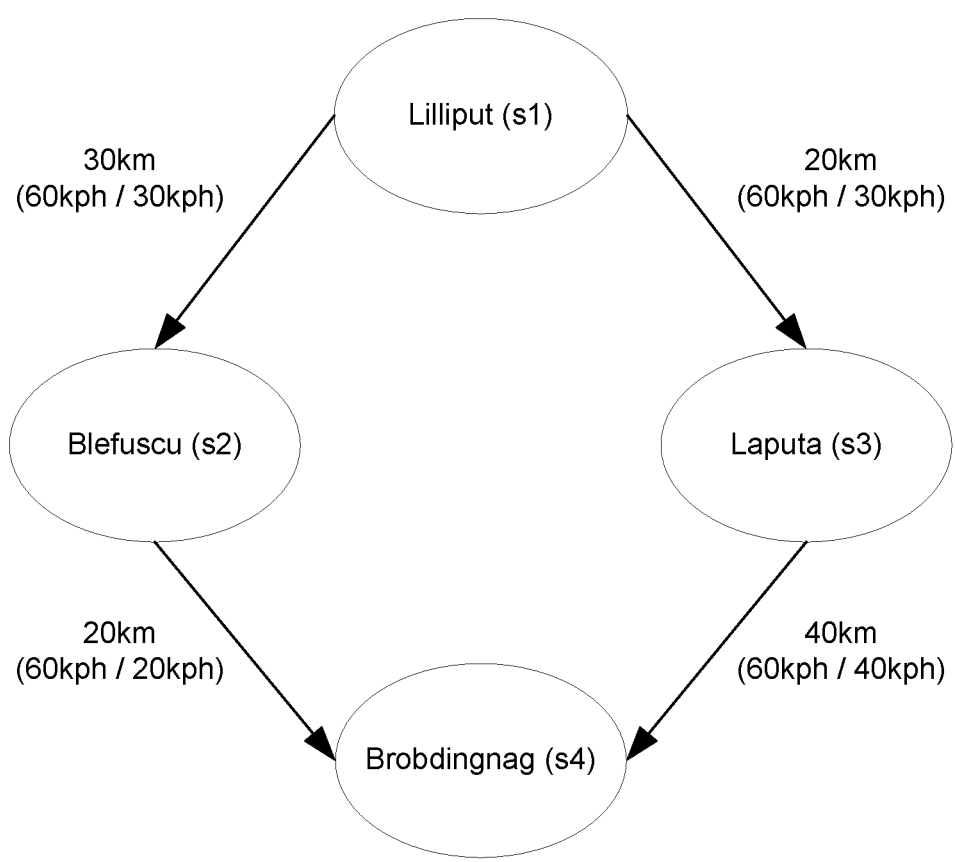
FIG. 2 is a map illustrating the use of a dynamic cost function to select an optimized route for a journey.

2.3 FIG. 2 Example

We demonstrate how the dynamic routing system results in a large concrete saving of time for an example trip. Consider the following schematic road map. A driver wishes to travel from Lilliput to Brobdingnag. What route should they take, and how long will it take them? The map is labeled with the distances along the roads, and the speeds at, respectively, lunchtime and the rush hour. For example, 30 km (60 kph/30 kph) indicates that the road segment is 30 km long, and according to the best information available to the transit time predictor, at lunch time (12:00) it will be traveling at 60 kph, while at rush hour (16:00) it will be traveling at 30 kph.

Consider our driver's options. (S)he can travel via either Blefuscu, or via Laputa. Assuming that all road speed limits are 90 kph, the trip via Blefuscu is shorter, and a conventional routing system will always propose this route. Now let us examine routing with a dynamic cost function:

Lunch Time

1. At 12:00 Lilliput s1 to Blefuscu s2 takes 30 min at 60 kph. At 12:30 (when the driver arrives at Blefuscu s2) the trip to Brobdingnag s4 takes 20 min at 60 kph for another 20 min. The total trip duration is 50 min.

2. At 12:00 Lilliput s1 to Laputa s3 takes 20 min at 60 kph. At 12:20 (arriving in Laputa s3) the trip to Brobdingnag s4 takes 40 min at 60 kph for another 20 min, a total duration of 60 min.

So at lunch time, it is clearly better to travel via Blefuscu.

Rush Hour

1. At 16:00 Lilliput to Blefuscu takes 60 min at 30 kph. The driver arrives in Blefuscu at 17:00, and takes a further 60 min to travel the 20 km to Brobdingnag at 20 kph. The trip has taken a total of 120 min.

2. At 16:00 Lilliput to Laputa takes 40 min at 30 kph. The driver arrives at Laputa at 16:30, at which time it will take them a further 60 min to travel the 40 km to Brobdingnag at 40 kph. The trip takes a total of 100 min.

So during the rush hour, the choice of travelling via Laputa has saved our driver 20 minutes.

3. Updating/Monitoring Chosen Routes

When the routing system has calculated a route for a driver, the state of the roads may change unexpectedly while the driver is still traversing the route. A routing system implementation may be constructed which in real time ensures that the driver is still taking the best route. This requires that:

The driver should be in contact with the routing system to indicate the position reached on the route; as a fallback the system may estimate the driver's position based on the speed of the proposed route.

The routing system periodically recalculates the driver's route from their current position to the destination.

The routing system uses a communication mechanism to inform the driver when the calculated route has been changed.

3.1 Efficient Distributed Dynamic Routing System

A common implementation of a system providing dynamic routing places a personal navigation system (PNS) in the user's vehicle, or in some form of mobile situation with the user. The PNS is in (intermittent) communication with a central navigation system (CNS) which is a fixed network interconnected system containing the traffic monitoring system. We can view the system as distributed between the PNS and the CNS.

The state of the art in communication systems between PNS and CNS (e.g. General Packet Radio Service "GPRS") does not provide high bandwidth, low latency or continuous communication in general, so that communication problems must be dealt with in the architecture of an implementation.

In addition, where the system contains a large number of PNSs, the costs of performing significant computations on the CNS, in particular doing routing can be prohibitive. Similarly, maintaining state on behalf of all PNSs at the CNS adds significantly to the complexity and computational resources which must be deployed at the CNS.

In a distributed dynamic routing system, the routing intelligence may be located:

On the PNS alone
- The PNS contains a recent snapshot of the historical database
- The PNS receives congestion information from the CNS
- The PNS implements transit time prediction and a routing system based on its approximation Shared between PNS and CNS
- PNS and CNS both calculate a route for the user
- The CNS information is always the best
- CNS and PNS try to ensure that PNS provides an always good enough (or better) route with minimal surprises to the user.

A routing system at the CNS alone suffers from the lack of guaranteed connectivity between CNS and PNS, and in any case current state of the art PNSs use static routing at the PNS; so it is always possible to provide what can be viewed as simply a degenerate case of PNS routing.

The various alternatives have different advantages, and we examine how each can be implemented with the goals of providing fast and accurate route selection with low communication costs. Finally we describe a routing system which has the advantage of being stateless for the CNS and low-cost in bandwidth.

3.2 PNS Routing

When the PNS does the routing, it must indicate to the CNS the geographical area which is of interest to it. This is an area surrounding the source and destination of a route, with enough slack that any sensible route will always be within the area. We will call this the routable area. Then the CNS needs to ensure that 1. PNS receives updates when road segments in the routable area are travelling at a speed (hence have a cost) significantly different from that predicted by the information at the PNS; usually this means that there is an unexpected delay (congestion) on the road segment.

2. PNS has an up-to-date historical view of the routable area. The historical database tends to change slowly, and the CNS may provide the PNS with dynamic updates of historical information in the routable area which is out of date.

In sum, the CNS ensures that the PNS has a good enough view of the routable area to produce a route which is very close to the optimal route that the CNS itself would generate. PNS routing has real-time advantages. Whether or not the PNS is in contact with the CNS, a best known route can be calculated and used by the driver until updates are received from the CNS to recalculate the route and (possibly) redirect the driver.

One problem with this form of PNS routing is that the PNS must poll the CNS for updates to the prediction function in the routable area, or the CNS must maintain state recording the routable area of the PNS, so that it can push updates to the PNS.

3.3 Shared Routing

Both PNS and CNS can participate in guiding a driver on a route. Where these are in contact, PNS and CNS can both calculate the route, then they can negotiate about differences in their selected routes, or rest happy that both have chosen the same route.

For example:
1. Driver asks PNS to (route A B)
2. PNS calculates (A r s t B)
3. PNS sends to CNS (selected-route A B (r s))
   which route is was asked to make
   the first waypoint(s) (equivalently the first route segments) which it has selected
4. CNS calculates the (route A B) using its routing system, which by definition yields the best possible route that this technology can generate. (A x y z B)
5. CNS compares the route it has generated with the route generated by the PNS. In this example, CNS has routed via x, y, and z, a completely different route to PNS, so it would seem necessary to let PNS know.
6. Where there are differences, CNS transmits these back to the driver. In particular, it need only transmit immediately if there are differences at the start of the route. And it need only transmit the first difference; on receipt of a difference, PNS can calculate a remaining route from the next waypoint on the route supplied by PNS. So CNS tells PNS (selected-route A B (x)) and PNS calculates (route A via-x B) which, happily, the PNS calculates as (A x y z B).

If a difference exists later on the route, PNS may even choose to not transmit the route until the driver is nearer to the divergence of routes, on the grounds that the divergence may be caused by temporary congestion which will have cleared when the driver reaches it.

7. The CNS continues to monitor the driver's route, sending notifications if it recalculates a different route at a later time.

Shared routing in this and related forms is extremely efficient in bandwidth. It is also very close to optimal for route finding, given the correct dynamic cost function. The main problem with shared routing is that it places significant computation and state costs on the CNS.

Figure 3:
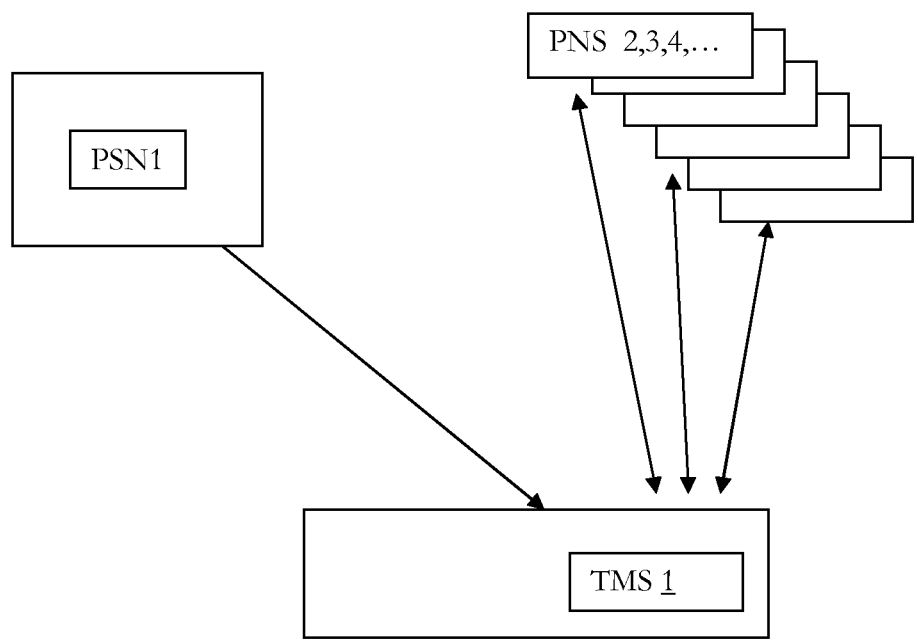
FIG. 3 is a schematic representation of the operation of a distributed dynamic routing system.

3.4 FIG. 3 Low Network Load PNS Routing

When the system uses PNS routing, it turns out that a good enough routing can be made using the dynamic routing function on the PNS which encodes the historical information, plus a very small amount of delay information requested from the CNS. The key is to do routing on the PNS to identify the few road segments which must have their costs updated on the PNS with the most up to date values as calculated by the CNS. This then allows the PNS to refine its route to approaching the optimal route as would have been calculated by the CNS using the dynamic cost function.

Here is the mechanism:
1. PNS constructs the routable area for the route A to B, and asks the CNS for the CNS cost values over the times at which the route will be used for any road segments in the routable area which are lower cost according to the CNS cost function than according to the PNS cost function. The CNS knows which cost function the PNS is using because the PNS can tell the CNS the version of the historical database which it holds. The CNS holds an encoding of all of the historical databases which are present in the population of PNSs, so that it can determine for any road segment whether any of the segment's cost values must be returned to the PNS. A minimum cost difference per segment is defined, $d_s$, so that the CNS only sends to the PNS the road segments and CNS cost values (segment, $cost_{cns}$(segment)) which satisfy $cost_{cns}$(segment)+$d_s$≤$cost_{pns}$(segment), that is those with a CNS cost value lower by at least ds. Practically, the number of such selected road segments, and hence the message size and cost, will be small.

2. Now the PNS constructs a modified cost function, routecost$_{pns}$, which assigns the cost values returned by the PNS for the lower cost road segments returned in the previous stage, and assigns the historical values held by the PNS for all other road segments. The PNS performs a routing calculation from A to B using routecost$_{pns}$. The route selected by this calculation is called the candidate route bestroute$_{pns}$. The CNS cost function, routecost$_{cns}$, may attach a higher cost to this route than routecost$_{pns}$ because the modified PNS cost function does not know about unusually high costs (equating to delayed road segments) which the CNS cost function knows about. But because of the modification of the PNS cost function in the previous stage, bestroute$_{pns}$ will have a cost according to PNS which is not much greater than the lowest cost route according to routecost$_{cns}$, which we call bestroute$_{cns}$. In fact: routecost$_{pns}$(bestroute$_{pns}$)≤routecost$_{cns}$(bestroute$_{cns}$)+segmentcount(bestroute$_{cns}$)d$_s$. The value of d$_s$ used in the system is chosen in order to trade off how close routecost$_{pns}$(bestroute$_{pns}$) must be to routecost$_{cns}$(bestroute$_{pns}$) against the time and network bandwidth required to transmit road segments and costs in stage 1.

3. It now remains to check that the cost CNS assigns to the candidate route chosen by PNS, routecost$_{cns}$(bestroute$_{pns}$), is not much worse than the cost PNS assigns to it. To do this, the PNS requests the CNS cost values for the road segments on bestroute$_{pns}$. The CNS supplies the cost values for these road segments to the PNS, and the PNS updates its cost function to incorporate these road segment cost values from CNS. If the CNS retains the PNS historical database version number, or the PNS sends the version number again on this request, the CNS need only reply with those road segment cost values which differ from those which the PNS holds in its database. The PNS cost function is now routecost$_{pns}^{updated}$ 4. The PNS now calculates routecost$_{pns}^{updated}$(bestroute$_{pns}$) the cost of the candidate route which it previously selected, this time using the CNS supplied cost values for the road segments on that route. Notice that routecost$_{pns}^{updated}$(bestroute$_{pns}$)=routecost$_{cns}$(bestroute$_{pns}$). A maximum acceptable cost difference dextra$_{route}$ is defined to test whether bestroute$_{pns}$ is to be accepted as the route to offer to the client at this stage. bestroute$_{pns}$ is accepted just in case routecost$_{pns}^{updated}$(bestroute$_{pns}$)≤routecost$_{pns}$(bestroute$_{pns}$)+dextra$_{route}$. The value of dextra$_{route}$ used by the system is chosen to trade off how close routecost$_{pns}^{updated}$(bestroute$_{pns}$) is to routecost$_{cns}$(bestroute$_{cns}$) against the time and network bandwidth which the mechanism consumes.

5. If bestroute$_{pns}$ was accepted, the process of route selection is complete and bestroute$_{pns}$ is issued to the user of the PNS.

6. If bestroute$_{pns}$ was not accepted, the mechanism returns to stage 2, except that this time routecost$_{pns}$ updated is used to select a new candidate route bestroute'$_{pns}$. If bestroute'$_{pns}$=bestroute$_{pns}$ (or, on further iterations, any previously selected candidate route) then bestroute'$_{pns}$ is accepted immediately. Otherwise the system runs the same process again, requesting the CNS cost values for bestroute'$_{pns}$ (stage 3) updating routecost$_{pns}$ updated, and calculating routecost'$_{pns}^{updated}$(bestroute'$_{pns}$) (stage 4).

7. Eventually, and usually very quickly given a reasonable choice of dextra$_{route}$, one of the candidate routes which the system generates is accepted. It can be shown that the PNS must eventually accept a candidate route because the cost function routecost$_{pns}^{updated}$ will eventually stabilize equal to routecost$_{cns}$, at which point routecost$_{pns}^{updated}$=routecost$_{pns}$ and the acceptance condition for the current candidate route routecost$_{pns}^{updated}$(bestroute$_{pns}$)≤routecost$_{pns}$(bestroute$_{pns}$)+dextra$_{route}$ will hold immediately.

8. The system issues the accepted route to the user of the PNS.

9. If at any stage connectivity is lost between PNS and CNS, the PNS can issue the current candidate route to the user. Indeed, it is often best to issue the first stage of a route immediately, and then to route from the next junction which the driver will approach. The interaction with the system appears much more natural to the user if they do not need to wait more than a fraction of a second for an initial response from the system after requesting a route.

10. As the driver travels towards the destination, the system can periodically request (as in stage 3) the costs for the remaining road segments of the accepted route. If a delay builds further down the route, the PNS can automatically re-route from the current position by resuming the algorithm at stage 4.

Low cost PNS routing performs all its routing calculations on the PNS (hence PNS routing) but at the same time it requires minimal state on the CNS, and it makes minimal bandwidth demands. It has the PNS routing advantage of being able to carry on being useful when it is out of contact with the CNS. In addition, low cost PNS routing produces routes which are practically sufficiently close in cost to routes produced using dynamic routing at the CNS, such that almost all of the cost savings associated with dynamic routing can be realized in practice.

3.5 Reducing Communication Costs

However the responsibilities for route selection are divided, the cost of data transmission can be kept low using a number of techniques:

Location-Relative Segment Numbering

When the PNS and the CNS are in communication, the precise location of the driver and PNS is almost always required by the CNS. Because most road segments of interest are local to the driver (or to a requested route for the driver) an alternative route numbering system can be put in place temporarily between PNS and CNS where only a small number of bits are necessary to identify the most commonly transmitted road segments.

Route-Relative Segment Numbering

A route from A to B can be entirely described by counting exits at each junction traversed on the route. Where each road segment is of significant length, this results in a very compact representation of a route.

Where, as is typical, a large section of a route may bye on the same road, a form of run length encoding may be used. Then a route my be represented as (3,13,2,28,2,15) meaning 3rd exit a next junction
   straight through next 13 junctions
   2nd exit at 14th junction
   straight through next 28 junctions
   2nd exit at 29th junction
   straight through 15 junctions
   arrive.

BIBLIOGRAPHY

Dijkstra: Edsgar W. Dijkstra, A Note on Two Problems in Connection with Graphs, 1959
CFIT: UK Commission for Integrated Transport, Congestion Charging, RoDIN24: Applied Generics, RoDIN24 real-time road traffic information, 2005.

The invention claimed is:

1. A routing system, comprising memory storing a map database that defines roads in terms of route segments, the map database including:
   a fixed, predefined time-independent cost associated with each different route segment in the map database; and
   a historical time-dependent cost, for each of a plurality of time windows, associated with at least some of the route segments in the map database, the cost relating to an average vehicle speed or transit time along the route segment measured or inferred from historical vehicle traffic flow or movement obtained by a traffic monitoring system,
   the routing system being programmed with software comprising a routing algorithm that plans a route from a source to a destination at a specific time using one or more route segments and that calculates an estimated cost of reaching the destination, and
   the routing system being arranged to receive updated time-dependent costs for one or more route segments in a routable area for at least one of a current and future time based on an identification of currently congested route segments by the traffic monitoring system, the routable area indicating a geographical area of interest including the source and the destination of the route,
   wherein the estimated cost of reaching the destination is automatically calculated using:
   the time-dependent cost for a route segment if available, the time-dependent cost being:
      an updated cost, when the updated cost for the route segment at the specific time has been received; and
      the historical cost for a corresponding time window, when the updated cost for the route segment at the specific time has not been received; or
   the fixed, predefined time-independent cost for the route segment if a time-dependent cost for the route segment is not available in the map database.

2. The routing system of claim 1 in which the fixed, predefined time-independent cost associated with a particular route segment has not been measured or inferred from actual vehicle traffic flow or movement but instead is a function of:
   a type of road associated with that route segment; or (ii) the speed limit applicable to that route segment.

3. The routing system of claim 1 in which the cost associated with a particular route is at least one of: an estimated time taken to reach the destination; a fuel usage associated with the route; and a chargeable financial cost associated with the route.

4. The routing system of claim 1 in which the cost associated with a particular route is of a type that an end-user can select from a menu list displayed on a computing device.

5. The routing system of claim 1 in which the software calculates the cost of the route as part of a cost minimization algorithm.

6. The routing system of claim 1 in which the historical time-dependent costs are a function of at least one of: a time of day or night; the days of the week; public holidays; school holidays; and any event that will likely impact on route segment costs.

7. The routing system of claim 1 in which the routing system is one of: a GPS based portable navigation device; a mobile telephone with a location finding system; and a device permanently embedded into a motor vehicle.

8. The routing system of claim 1, wherein the system comprises a historical database containing historical data related to the routable area.

9. The routing system of claim 8, wherein the system receives dynamic updates to the historical data related to the routable area.

10. The routing system of claim 1, wherein the estimated costs of reaching the destination is additionally based on a driving profile associated with a particular driver.

11. The routing system of claim 10, wherein the driving profile is automatically selected based on the user's driving style.

12. The routing system of claim 1, wherein the received updated time-dependent costs is restricted to a class of road types.

13. The routing system of claim 1, wherein the routing system is arranged to provide information about the route to a user, recalculate the route, and provide, based on the recalculation, information about route changes to the user.

14. A method of planning a route to a destination, comprising:
   using, by a processor, a map database that defines roads in terms of route segments, the map database including:
      a fixed, predefined time-independent cost associated with each different route segment in the map database: and a historical time-dependent cost, for each of a plurality of time windows, associated with at least some of the route segments in the map database, the cost relating to an average vehicle speed or transit time along the route segment measured or inferred from historical vehicle traffic flow or movement obtained by a traffic monitoring system:
   receiving, by the processor, updated time-dependent costs for one or more route segments in a routable area for at least one of a current and future time based on an identification of currently congested route segments by the traffic monitoring system, the mutable area indicating a geographical area of interest including the source and the destination of the route; and
   using, by the processor, software comprising a routing algorithm that plans a route from a source to a destination at a specific time using one or more route segments and that calculates an estimated cost of reaching that destination by automatically using:
   the time-dependent cost for a route segment if available, the time-dependent cost being:
      an updated cost, when the updated cost for the route segment at the specific time has been received; and
      the historical cost for a corresponding time window, when the updated cost for the route segment at the specific time has not been received; or
   the fixed, predefined time-independent cost for the route segment if a time-dependent cost for the route segment is not available in the map database.

15. The method of claim 14 in which the fixed, predefined time-independent cost associated with a particular route segment has not been measured or inferred from actual vehicle traffic flow or movement but instead is a function of: (i) a type of road associated with that route segment; or (ii) a speed limit applicable to that route segment.

16. The method of claim 14 in which the cost associated with a particular route is at least one of: an estimated time taken to reach the destination; a fuel usage associated with the route; and a chargeable financial cost associated with the route.

17. The method of claim 14 in which the cost associated with a particular route is of a type that an end-user can select from a menu list displayed on a computing device.

18. The method of claim 14 in which the software calculates the cost of the route as part of a cost minimization algorithm.

19. The method of claim 14, further comprising providing information about the route to a user, recalculating the route, and providing, based on the recalculation, information about route changes to the user.

20. A non-transitory computer-readable medium storing computer software that, when executed on a computer, causes the computer to perform a method of planning a route to a destination, the method executed comprising:

using a map database that defines roads in terms of route segments, the map database including: a fixed, predefined time-independent cost associated with each different route segment in the map database; and a historical time-dependent cost, for each of a plurality of time windows, associated with at least some of the route segments in the map database, the cost relating to an average vehicle speed or transit time along the route segment measured or inferred from historical vehicle traffic flow or movement obtained by a traffic monitoring system;

receiving updated time-dependent costs for one or more route segments in a routable area for at least one of a current and future time based on an identification of currently congested route segments by the traffic monitoring system, the routable area indicating a geographical area of interest including the source and the destination of the route; and using software comprising a routing algorithm that plans a route from a source to a destination at a specific time using one or more route segments and that calculates an estimated cost of reaching that destination by automatically the time-dependent cost for a route segment if available, the time-dependent cost being:

an updated cost, when the updated cost for the route segment at the specific time has been received; and the historical cost for a corresponding time window, when the updated cost for the route segment at the specific time has not been received; or the fixed, predefined time-independent cost for the route segment if a time-dependent cost for the route segment is not available in the map database.

21. The non-transitory computer-readable medium of claim 20, wherein the method further comprises providing information about the route to a user, recalculating the route, and providing, based on the recalculation, information about route changes to the user.

* * * * *